United States Patent
Ko et al.

(10) Patent No.: US 9,477,326 B2
(45) Date of Patent: Oct. 25, 2016

(54) METHOD OF DETERMINING OBJECT POSITION AND SYSTEM THEREOF

(71) Applicants: Yi-Hsien Ko, Hsin-Chu (TW);
Chia-Cheun Liang, Hsin-Chu (TW);
Nien-Tse Chen, Hsin-Chu (TW)

(72) Inventors: Yi-Hsien Ko, Hsin-Chu (TW);
Chia-Cheun Liang, Hsin-Chu (TW);
Nien-Tse Chen, Hsin-Chu (TW)

(73) Assignee: PIXARAT IMAGING INCORPORATION, Hsin-Chu (TW)

( * ) Notice: Subject to any disclaimer, the term of this patent is extended or adjusted under 35 U.S.C. 154(b) by 331 days.

(21) Appl. No.: 13/863,222

(22) Filed: Apr. 15, 2013

(65) Prior Publication Data
US 2013/0278502 A1 Oct. 24, 2013

(30) Foreign Application Priority Data
Apr. 24, 2012 (TW) .............................. 101114459 A

(51) Int. Cl.
| G06F 3/03 | (2006.01) |
| G06F 3/041 | (2006.01) |
| G06K 7/10 | (2006.01) |
| G06K 9/50 | (2006.01) |
| G06K 9/32 | (2006.01) |
| G08C 23/04 | (2006.01) |
| H04N 1/64 | (2006.01) |
| H04N 5/367 | (2011.01) |
| G06T 7/00 | (2006.01) |

(52) U.S. Cl.
CPC .................. G06F 3/0308 (2013.01)

(58) Field of Classification Search
CPC .... G06F 3/033; G06F 3/0325; G06F 3/0304; G06K 9/50
USPC ....... 345/158, 163, 173, 175, 177, 207, 634; 348/744; 356/608, 614; 382/133, 173, 382/182, 225, 314; 398/106; 455/456.2; 715/711
See application file for complete search history.

(56) References Cited

U.S. PATENT DOCUMENTS

| 5,161,013 | A | * | 11/1992 | Rylander et al. ............. 348/744 |
| 6,021,213 | A | * | 2/2000 | Helterbrand .......... G06T 7/0081 382/128 |
| 7,796,116 | B2 | * | 9/2010 | Salsman ............... G06F 3/0346 345/158 |
| 7,853,080 | B2 | * | 12/2010 | Teoh ..................... G06F 3/0325 382/180 |
| 8,390,578 | B2 | * | 3/2013 | Chino ................... G06F 3/0416 178/18.01 |
| 8,711,125 | B2 | | 4/2014 | Zhu et al. |
| 2004/0264793 | A1 | * | 12/2004 | Okubo .................... H04N 1/642 382/243 |
| 2006/0245649 | A1 | * | 11/2006 | Chen ........................ G06K 9/50 382/173 |
| 2007/0295814 | A1 | * | 12/2007 | Tanaka ............... G06K 7/10722 235/454 |
| 2008/0002872 | A1 | * | 1/2008 | Gatesoupe et al. ........... 382/132 |
| 2008/0219566 | A1 | * | 9/2008 | Teoh ..................... G06F 3/0317 382/225 |
| 2009/0001165 | A1 | * | 1/2009 | Zhang ................. G06K 7/1093 235/462.11 |

(Continued)

FOREIGN PATENT DOCUMENTS

| CN | 101841672 A | 9/2010 |
| CN | 101847316 A | 9/2010 |

*Primary Examiner* — Lin Li
(74) *Attorney, Agent, or Firm* — Tung & Associates

(57) ABSTRACT

The present invention provides a method for determining an object position, including the following steps: determining the intensities of a plurality of pixels; determining that a portion of pixels in the plurality of pixels belong to an object image corresponding to an object; and determining coordinate data of the object based on a number of pixels in each row or column of the portion of the plurality of pixels belonging to the object image and the coordinates of pixels in the portion of the plurality of pixels belonging to the object image. The present invention also provides a pointing system.

10 Claims, 7 Drawing Sheets

(56) References Cited

U.S. PATENT DOCUMENTS

| | | | |
|---|---|---|---|
| 2010/0039296 A1* | 2/2010 | Marggraff | G06F 3/03545 341/20 |
| 2011/0013053 A1 | 1/2011 | Chen et al. | |
| 2011/0194725 A1* | 8/2011 | Das Gupta | G06K 19/06037 382/100 |
| 2012/0075253 A1 | 3/2012 | Tsai et al. | |
| 2012/0093363 A1* | 4/2012 | Hoshikawa | H04N 5/367 382/103 |
| 2013/0089334 A1* | 4/2013 | Lin | G08C 23/04 398/106 |
| 2013/0093675 A1* | 4/2013 | Lin | G06F 3/033 345/158 |
| 2013/0335349 A1* | 12/2013 | Ferren | G06K 9/3266 345/173 |

* cited by examiner

METHOD OF DETERMINING OBJECT POSITION AND SYSTEM THEREOF

CROSS REFERENCE

The present invention claims priority to TW 101114459, filed on Apr. 24, 2012.

BACKGROUND OF THE INVENTION

1. Field of Invention

The present invention relates to a method and a system, especially a method and a system of determining object position.

2. Description of Related Art

For calculating the corresponding coordinate data of an object sensed by an image sensor, a typical method is: first determining the sensed intensity values of all pixels in a captured image, and then calculating the coordinate data of the object by pixels with intensity values higher than a threshold.

Usually, the method also takes weighting into consideration; for example, the intensity value of each pixel is used as a weighting for calculating the corresponding coordinate data of the object sensed by the image sensor, to decide a gravity center of the object. That is, the coordinate of each pixel is multiplied by a weighting corresponding to its intensity value, in deciding the coordinate data of the object.

SUMMARY OF THE INVENTION

The present invention provides to a method of determining object position, which is capable of calculating coordinate data of the object.

The present invention also provides a pointing system, which can control an operation (for example: cursor movement) of an electronic device by the aforementioned method.

The other objectives and benefits of the present invention can be better understood from the detailed description below.

To achieve one or more of the above and other objectives, the present invention provides a method of determining object position, and the method comprises: determining an intensity value for each of a plurality of pixels; determining that a portion of pixels in the plurality of pixels belong to an object image corresponding to an object; and determining coordinate data of the object based on a number of pixels in each row or column of the portion of the plurality of pixels belonging to the object image and the coordinates of pixels in the portion of the plurality of pixels belonging to the object image.

In a preferable embodiment of the present invention, when there is at least one pixel with intensity value lower than a threshold between pixels with intensity values higher than the threshold in a row or column, and when the number of the at least one pixel is smaller than or equal to a number N, the at least one pixel is defined as part of the object image.

In a preferable embodiment of the present invention, wherein when there is at least one pixel with an intensity value lower than a threshold between pixels with intensity values higher than the threshold in a row or column, and when there is no pixel with intensity value lower than the threshold between pixels with intensity values higher than the threshold in an adjacent row or column, the at least one pixel is defined as part of the object image.

In a preferable embodiment of the present invention, wherein the step of determining an intensity value for each of a plurality of pixels comprises: determining an intensity value of every pixel in an image sensed by a light sensing device.

In a preferable embodiment of the present invention, the step of determining coordinate data of the object comprises: determining a number of continuous pixels with intensity values higher than the threshold in each row or column of the object image; and giving a weighting related to the number of continuous pixels to the corresponding row or column and calculating the coordinate data of the object accordingly.

In a preferable embodiment of the present invention, the weighting is decided by the number of pixels with intensity values higher than the threshold in each row or column.

In a preferable embodiment of the present invention, the weighting is higher when the number of continuous pixels with intensity values higher than the threshold is higher.

In another aspect, the present invention provides a pointing system, and a preferable embodiment of the pointing system comprises at least one object, an image sensing unit, and a processing unit. The image sensing unit is for sensing the object to generate an image data. The processing unit receives the image data and performs the following steps: determining an intensity value for each of a plurality of pixels; determining that a portion of pixels in the plurality of pixels belong to an object image corresponding to an object; and determining coordinate data of the object based on a number of pixels in each row or column of the portion of the plurality of pixels belonging to the object image and the coordinates of pixels in the portion of the plurality of pixels belonging to the object image.

In one preferable embodiment of the present invention, the at least one object is a light emitting device or a reflective strip.

According to the above, in a preferable embodiment, the object position determining method and the pointing system of the present invention have at least the following features: first, a weighting relevant to the number of continuous pixels in a corresponding row or column is given to that row or column, and therefore coordinate data of an object is calculated accurately and effectively. Second, the calculation can be even more accurate by amending the object image.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, but not drawn according to actual scale. The orientation wordings in the description such as: up, down, left, and right are for reference with respect to the drawings only, not for limiting a product made according to the present invention.

Figure 1:
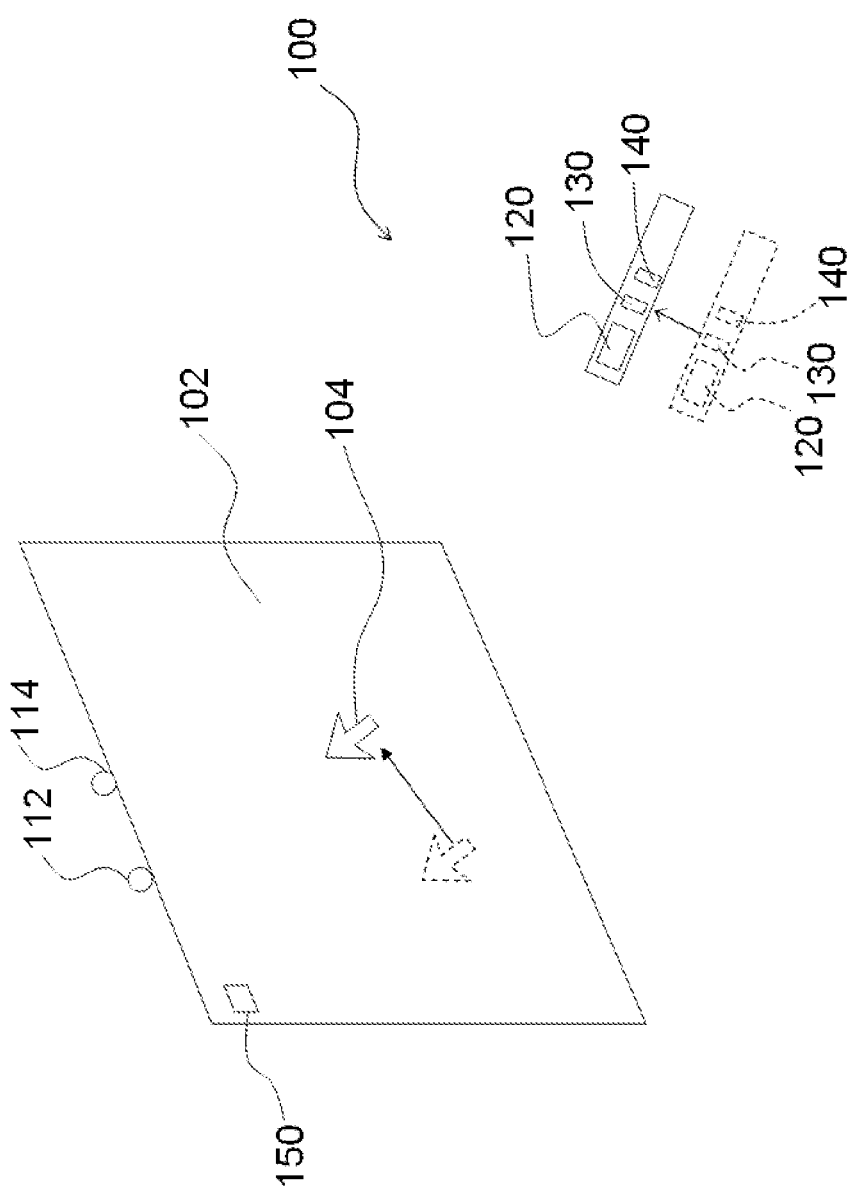
FIG. 1 shows a preferable embodiment of the pointing system of the present invention.
Figure 2:
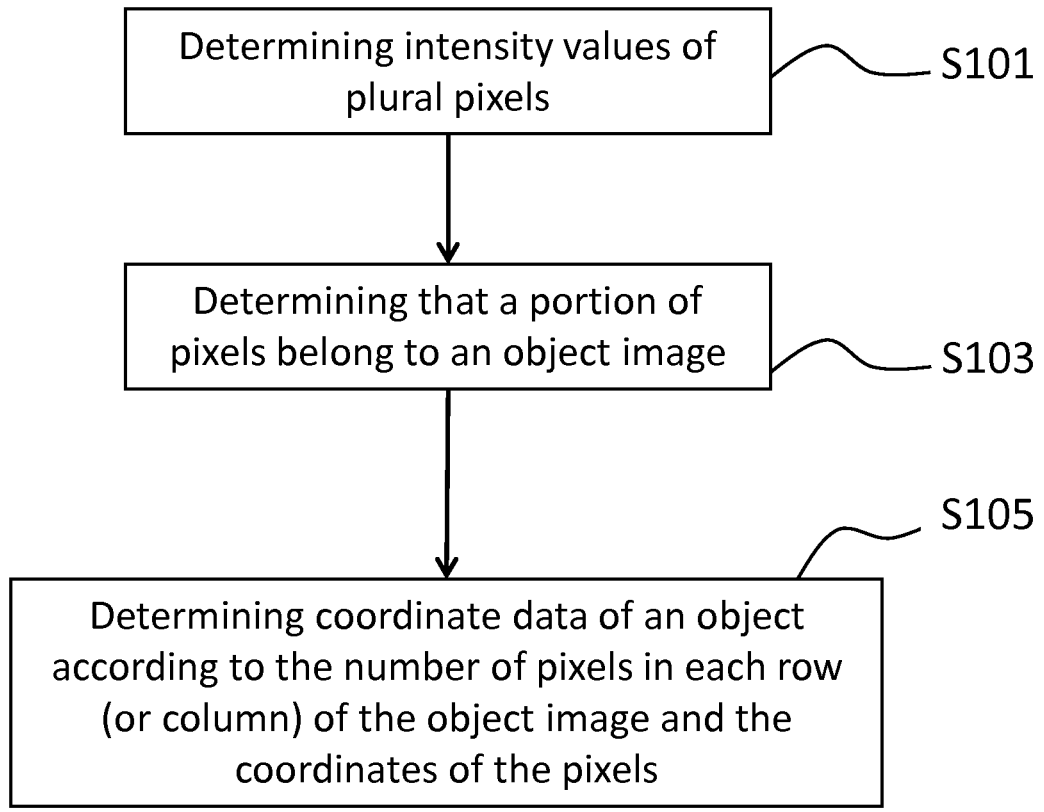
FIG. 2 is a flow chart showing how the pointing system shown of FIG. 1 processes an image signal.

FIG. 1 shows an embodiment of a pointing system of the present invention, and FIG. 2 is a flow chart showing how the pointing system shown of FIG. 1 processes an image signal. Please refer to FIGS. 1 and 2, the pointing system 100 can be used to move a cursor 104 displayed on a screen 102, or to perform other operations. The pointing system 100 comprises at least one object (in this embodiment two objects 112 and 114), an image sensing unit 120 and a processing unit 130. In this embodiment, the objects 112 and 114 can be light emitting devices, light reflective strips, or any other devices capable of emitting or reflecting light. For example, the objects 112 and 114 can be infrared light sources, which are used in the present embodiment. In another embodiment, the objects 112 and 114 can be light sources of another wavelength band, and preferably invisible light sources such as ultraviolet light sources. If the objects 112 and 114 are reflective articles such as reflective strips, the pointing system 100 preferably further provides infrared light which is projected on the objects 112 and 114, such that the image sensing unit 120 can sense the objects 112 and 114.

Figure 3A:
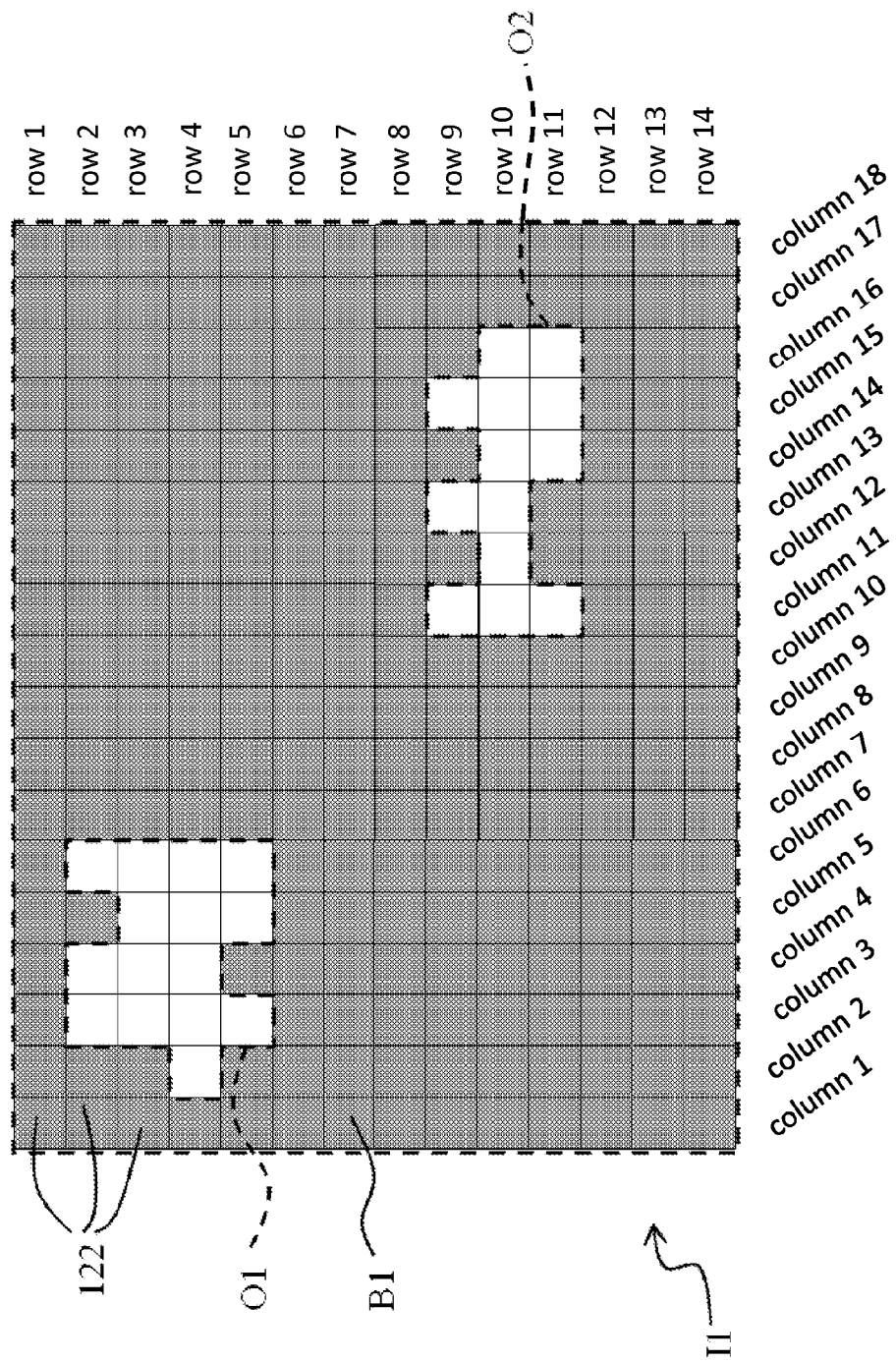
FIG. 3A is a diagram showing an image sensed by the image sensing unit shown in FIG. 1 and the intensity value of each pixel therein.

In pointing system 100, the image sensing unit 120 is adapted to sense the objects 112 and 114 to generate corresponding image data I1 as shown in FIG. 3A. FIG. 3A is a diagram showing an image sensed by the image sensing unit of FIG. 1 and the intensity value of each pixel therein. In this embodiment, the processing unit 130 is adapted to receive the image data I1 and perform the following steps: first determining the an intensity value for each of the pixels 122 in the image I1 sensed by the image sensing unit 120, as shown by step S101 of FIGS. 2 and 3A. If the objects 112 and 114 are infrared light sources, the image sensing unit 120 can correspondingly be an infrared image sensor to sense the images of the objects 112 and 114, such that the image sensing unit 120 is less influenced by the environmental light (such as: visible light or other unknown light) and the objects 112 and 114 can be more easily sensed to avoid or reduce misjudgment.

In this embodiment, the image sensing unit 120 includes plural light sensing pixels and the light received by the pixels generates corresponding photocurrents to generate the image data I1 as shown in FIG. 3A. More specifically, the image sensing unit 120 is preferably designed to cooperate with the objects 112 and 114. That is, if the objects 112 and 114 are implemented as infrared light sources, then the image sensing unit 120 is capable of sensing infrared light but does not sense or is less influenced by the environmental light of other wavelength bands. In short, the image data I1 sensed by the image sensing unit 120 is presented as information of infrared light intensity distribution.

After the intensity values of the pixels 122 in the image sensed by the image sensing unit 120 are determined, the pixels belonging to the object images O1 and O2 can be determined, as shown in step S103 of FIGS. 2 and 3A. In detail, because the objects 112 and 114 provide infrared light and the image sensing unit 120 can sense infrared light, the image sensing unit 120 will capture an image containing the object images O1 and O2 shown in FIG. 3A when sensing the objects 112 and 114. In order to reduce the interference from noises, a threshold can be defined to distinguish the object images O1 and O2 from the background B1, that is, pixels that are adjacent or connecting to one another and have intensity values higher than the threshold are defined as the object images O1 and O2, and the pixels with intensity values lower than the threshold are defined as the background B1. In a preferable embodiment according to the present invention, to improve the accuracy in calculating the coordinate data (such as but not limited to representative positions) of the objects 112 and 114, the object images O1 and O2 are amended and the calculation of the object coordinate data is based on the amended object images, as described in more detail below.

Figure 3B:
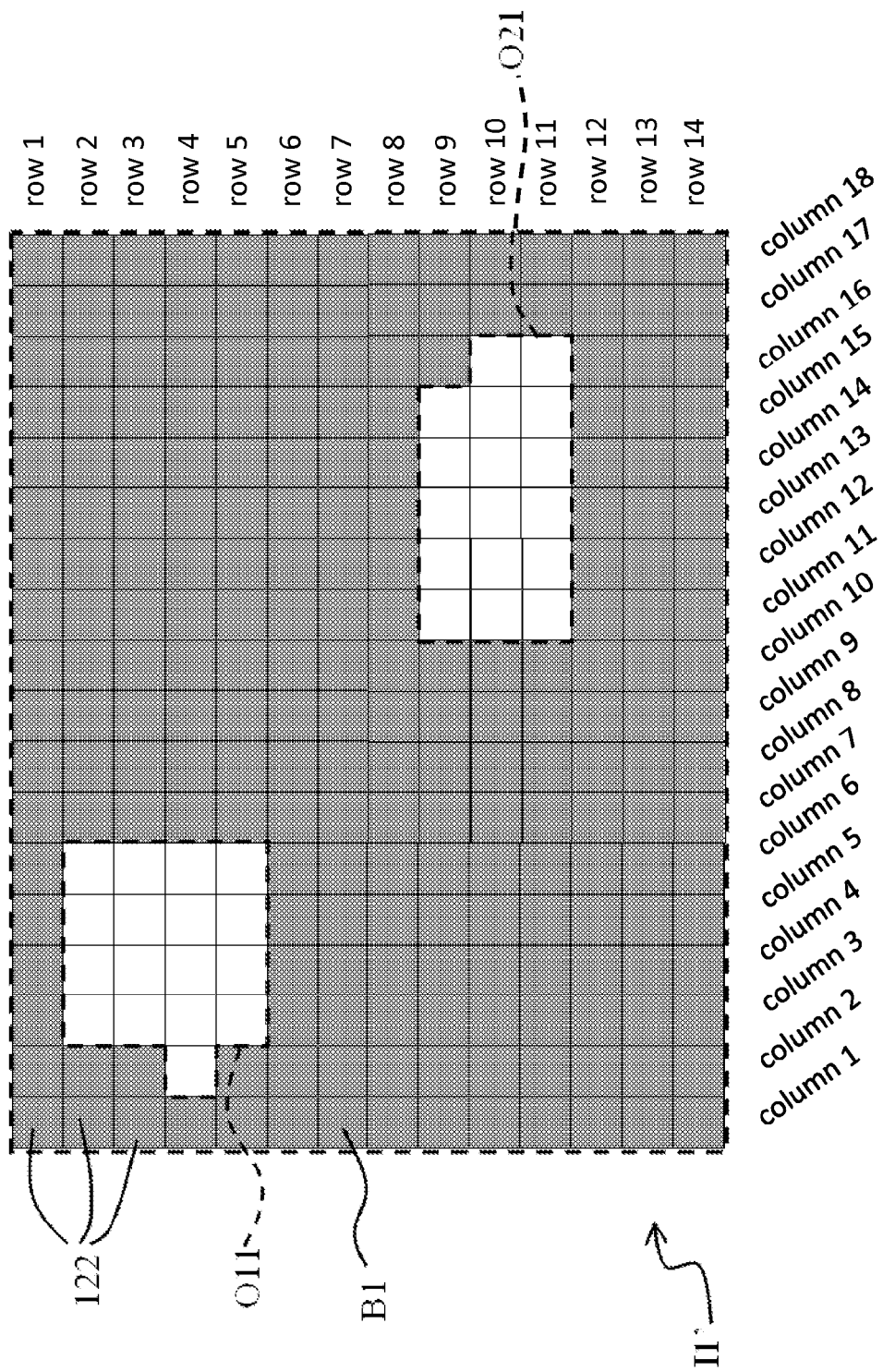
FIG. 3B is a diagram showing an image obtained by amending the object images of FIG. 3A.

The object images O1 and O2 in FIG. 3A are groups of adjacent pixels with intensity values higher than the threshold, which are portions of the full image, and the object images O11 and O21 in FIG. 3B are obtained by amending the object images O1 and O2 in FIG. 3A. According to a preferable embodiment of the present invention, the amendment is thus: referring to FIGS. 3A and 3B, in each column or row, if there is at least one pixel with intensity value lower than a threshold between pixels with intensity values higher than the threshold, and if the number of the at least one pixel is smaller than or equal to a number N, then the at least one pixel is defined as part of the corresponding object image O1 or O2, which is amended to become the object image O11 or O21. For example, the intensity values of pixels at (row 2, column 5), (row 5, column 4), (row 9, column 12), (row 9, column 14), and (row 11, columns 12-13) in FIG. 3A are lower than the threshold; because the intensity values of the adjacent pixels in the same column or row are higher than the threshold, the above pixels are defined to belong to the object image O1 or O2, and the object images O1 and O2 are amended to become the object images O11 and O21 as shown in FIG. 3B. In this embodiment the number N is 2 for example, but the present invention is of course not limited to this number; a user can define a suitable number N according to what he deems proper.

Next, as shown in step S105 of FIG. 2, the coordinate data of the objects 112 and 114 can be obtained according to the number of pixels in each row (or column) of the object images O11 and O21 in the image data I1' and the corresponding coordinates of the pixels. More specifically, every pixel has a corresponding coordinate. In this embodiment, to determine coordinate data of the objects 112 and 114, the number of continuous pixels with intensity values higher than the threshold in each row (or column) of the object images O11, O21 is first determined, and next the coordinate data of the objects 112 and 114 are calculated according to a weighting given to each row (or column) according to the number of continuous pixels in that row (or column).

As an illustrative example, referring to FIG. 3B, the numbers of continuous pixels in the rows 2, 3, and 5 of the object image O11 are 4, and the number of continuous pixels in the row 4 of the object image O11 is 5; thus, while calculating the coordinate data of the object image O11, the row weightings of the rows 2, 3, and 5 of the object image O11 are defined as 4, and the row weighting of the row 4 of the object image O11 is defined as 5. Similarly, the number of continuous pixels in the row 9 of the object image O21 is 5, and the numbers of continuous pixels in the rows 10 and 11 of the object image O21 are 6; thus, while calculating the coordinate data of the object image O21, the row weighting of the row 9 of the object image O21 is defined as 5, and the row weightings of the rows 10 and 11 of the object image O21 are defined as 6. Note that the weightings illustrated above are only for example, and the relationship between the number of continuous pixels and the weighting can be modified as desired to meet practical needs. In this embodiment, the weighting is determined by the number of continuous pixels with intensity values higher than the threshold in a row; i.e., the more the number is, the higher weighting is. However, this is only for illustrative purpose and the weighting also can be decided by the number of continuous pixels in each column according to the present invention.

Besides the aforementioned method for amending the object images to calculate the coordinate data of the objects, the present invention also proposes other methods for amending the object images to calculate the coordinate data of the objects, which will be explained later with reference to FIGS. 4A and 4B.

Figure 4A:
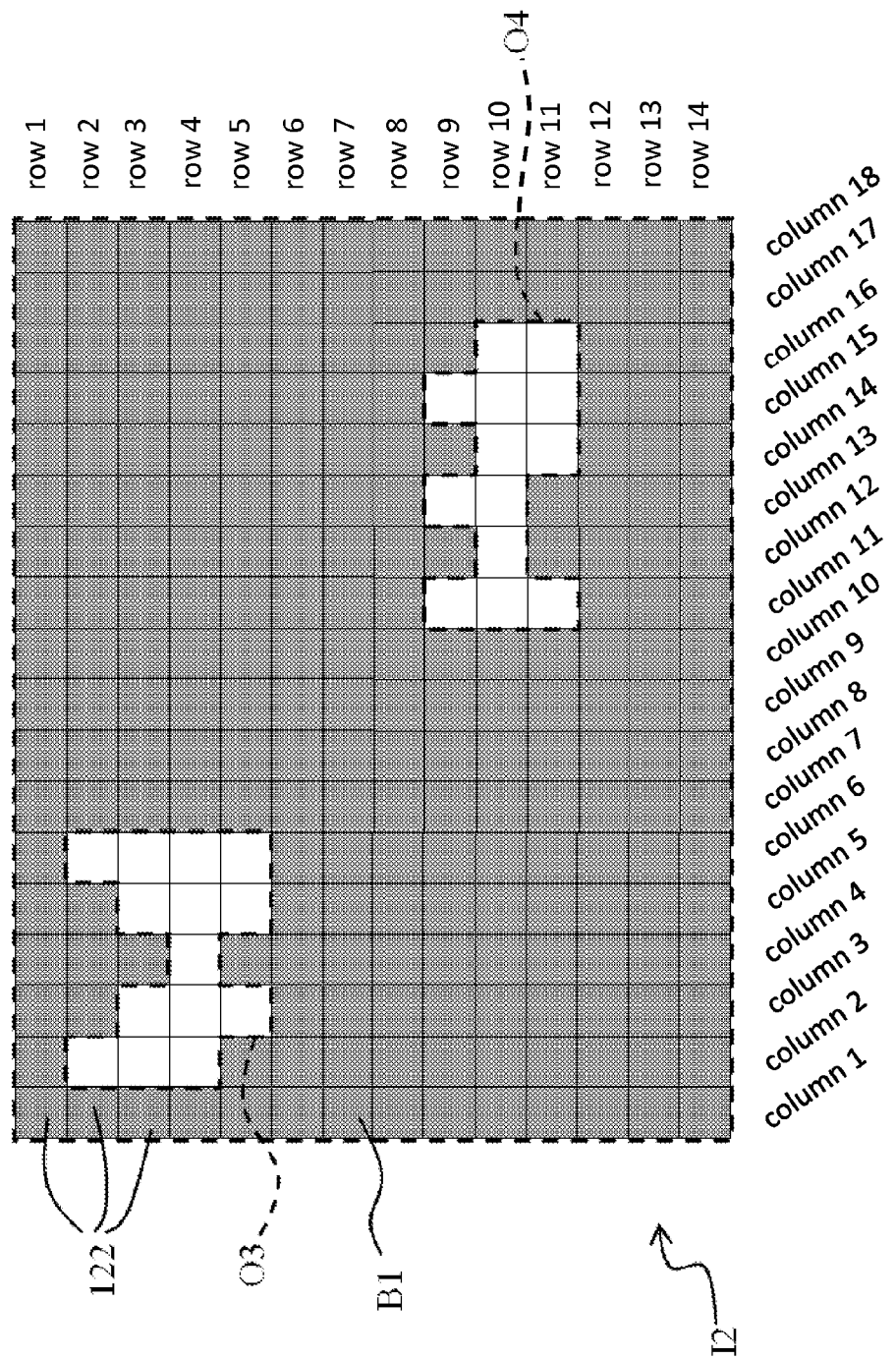
FIG. 4A is a diagram showing an image sensed by the image sensing unit shown in FIG. 1 and the intensity value of each pixel therein.
Figure 4B:
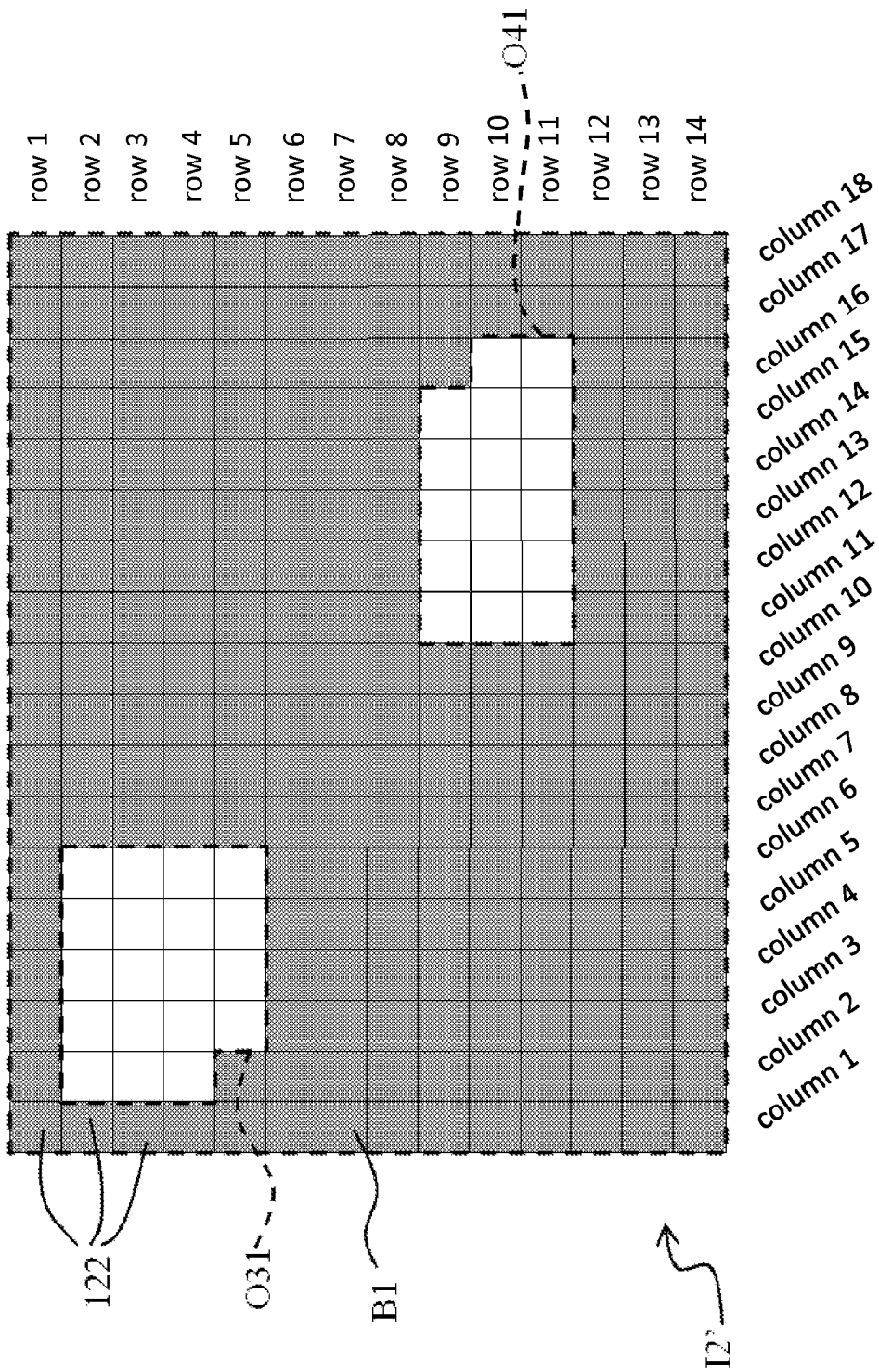
FIG. 4B is a diagram showing an image obtained by amending the object images of FIG. 4A.

FIG. 4A is a diagram showing an image sensed by the image sensing unit shown in FIG. 1 and the intensity value of each pixel therein, and FIG. 4B shows the object images O31 and O41 which are obtained by amending the object images in FIG. 4A, wherein the object images O3, O4 in FIG. 4A are obtained by adjacent pixels having intensity values higher than a threshold. Referring to FIGS. 4A and 4B, the amendment in FIG. 4B is thus: in each column or row, if there is at least one pixel with intensity value lower than the threshold between pixels with intensity values higher than the threshold, and if in an adjacent column or row, there is no pixel with intensity value lower than the threshold between pixels with intensity values higher than the threshold, then the at least one pixel is defined as part of the object image O3 or O4. For example, the intensity values of pixels at (row 2, column 3-5), (row 3, column 4), (row 5, column 4), (row 9, column 12), (row 9, column 14), and (row 11, column 12-13) are lower than the threshold, but these pixels are defined to belong to part of the object images O3 and O4 because there is no pixel with intensity value lower than the threshold between the pixels with intensity values higher than the threshold in the adjacent rows (rows 4 and 10, wherein row 4 is adjacent to row 3 and row 3 is adjacent to row 2, so row 4 is deemed adjacent to row 2), and thus, the object images O31 and O41 are obtained from amending the object images O3 and O4.

Similar to the previous embodiment, as shown in step S105 of FIG. 2, the coordinates of the objects 112 and 114 can be obtained according to the number of pixels in each row (or column) of the object images O31 and O41 in the image data I1' and the corresponding coordinates of the pixels. More specifically, every pixel has a corresponding coordinate. In this embodiment, to determine coordinate data of the objects 112 and 114, the number of continuous pixels with intensity values higher than the threshold in each row (or column) of the object images O31, O41 is first determined, and next the coordinate data of the objects 112 and 114 are calculated according to a weighting given to each row (or column) according to the number of continuous pixels in that row (or column).

As an illustrative example, referring to FIG. 4B, the numbers of continuous pixels in rows 2-4 of the object image O31 are 5; the number of continuous pixels in row 5 of the object image O31 is 4. Thus, while calculating the coordinate data of the object image O31, the weightings of rows 2-4 of the object image O31 are defined as 5, and the weighting of row 5 of the object image O31 is defined as 4. According to similar principle, the number of continuous pixels in row 9 of the object image O41 is 5, and the numbers of continuous pixels in rows 10-11 of the object image O41 are 6. Thus, while calculating the coordinate data of the object image O41, the weighting of row 9 of the object image O41 is defined as 5, and the weightings of rows 10-11 of the object image O41 are defined as 6. Note that the weightings illustrated above are only for example, and the relationship between the number of continuous pixels and the weighting can be modified as desired to meet practical needs. In this embodiment, the weighting is determined by the number of continuous pixels with intensity values higher than the threshold in a row; i.e., the more the number is, the higher weighting is.

Figure 5:
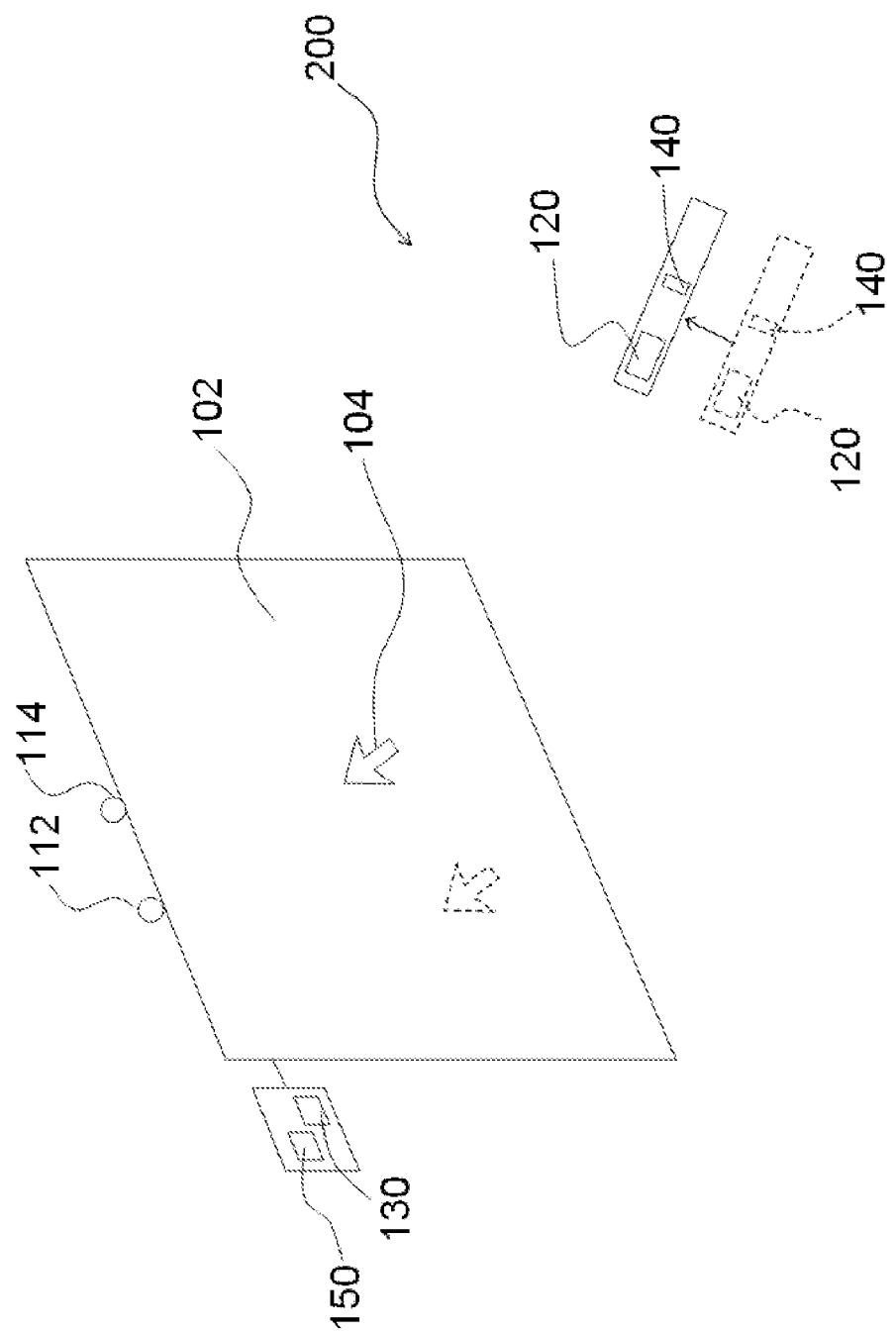
FIG. 5 shows another preferable embodiment of the pointing system according to the present invention.

According to this embodiment, as shown in FIG. 1, the pointing system 100 further comprises a transmitting unit 140, which can transmit the object coordinates calculated by the processing unit 140 to a receiving unit 150, to control the cursor 104 to move on the screen 102 according to the movement of the image sensing unit 120. In another embodiment as shown by the pointing system 200 of FIG. 5, the processing unit 130 is disposed at the screen side instead of the user side, that is, the image data I1 sensed by the image sensing unit 120 can be transmitted by the transmitting unit 140 to the processing unit 130 at the screen side to be processed and calculated, so that the cursor 104 on the screen 102 is moved in correspondence to the movement of the image sensing unit 120.

In addition to amending the object images, in another embodiment, a weighting is directly given to a corresponding row or column of an object image according to the number of continuous pixels in the object image without any amendment. Referring to the FIG. 3A for an example of no amendment, the pixel number of row 2 of the object image O1 is 3; the pixel number of row 3 of the object image O1 is 4; the pixel number of row 4 of the object image O1 is 5; and the pixel number of the row 5 of the object image O1 is 3. Therefore, while determining the coordinate data of the object image O1, the weightings of rows 2 and 5 of the object image O1 are defined as 3; the weighting of row 3 of the object image O1 is defined as 4; and the weighting of row 4 of the object image O1 is defined as 5.

Similarly, the pixel number of row 9 of the object image O2 is 3; the pixel number of row 10 of the object image O2 is 6; and the pixel number of row 11 of the object image O2 is 4. While determining the coordinate data of the object image O2, the weighting of row 9 of the object image O2 is defined as 3; the weighting of row 10 of the object image O2 is defined as 6; and the weighting of row 11 of the object image O2 is defined as 4. Note that the weightings illustrated above are only for example, and the relationship between the number of continuous pixels and the weighting can be modified as desired to meet practical needs. In this embodiment, the weighting is determined by the number of continuous pixels with intensity values higher than the threshold in a row; i.e., the more the number is, the higher weighting is. However, this is only for illustrative purpose and the weighting also can be decided by the number of continuous pixels in each column according to the present invention.

In view of the above, in a preferable embodiment, the object position determining method and the pointing system of the present invention have at least the following features: first, a weighting relevant to the number of continuous pixels in a corresponding row or column is given to that row or column, and therefore coordinate data of an object is calculated accurately and effectively. Second, the calculation can be even more accurate by amending the object image.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. An embodiment or a claim of the present invention does not need to achieve all the objectives or advantages of the present invention. The title and abstract are provided for assisting searches but not for limiting the scope of the present invention.

What is claimed is:

1. A method of determining object position, comprising:
    determining an intensity value for each of a plurality of pixels;
    determining whether said each of a plurality of pixels is a higher intensity pixel which has the intensity value higher than a threshold or a lower intensity pixel which has the intensity value lower than the threshold;
    determining that a portion of the plurality of pixels belong to an object image corresponding to an object; and
    determining coordinate data of the object based on a number of pixels in each row or column of the portion of the plurality of pixels belonging to the object image and coordinates of pixels in the portion of the plurality of pixels belonging to the object image;
    wherein when there is at least one lower intensity pixel between two or more higher intensity pixels in a row or column and when the number of the at least one pixel is smaller than or equal to a predetermined number, said at least one lower intensity pixel between two or more higher intensity pixels is defined as part of the object image, and said at least one lower intensity pixel between two or more higher intensity pixels is defined as a pixel with intensity value higher than the threshold; or
    when there is at least one lower intensity pixel with intensity value lower than a threshold between two or more higher intensity pixels in a row or column and when there is no lower intensity pixel between two or more higher intensity pixels in an adjacent row or column, said at least one lower intensity pixel between two or more higher intensity pixels is defined as part of the object image, and said at least one lower intensity pixel between two or more higher intensity pixels is defined as a pixel with intensity value higher than the threshold.

2. The method of claim 1, wherein the step of determining an intensity value for each of the plurality of pixels comprises: determining an intensity value of every pixel in an image sensed by a light sensing device.

3. The method of claim 1, wherein the step of determining coordinate data of the object comprises:
    determining a number of continuous pixels with intensity values higher than the threshold in each row or column of the object image; and
    giving a weighting related to the number of continuous pixels to the corresponding row or column and calculating the coordinate data of the object accordingly.

4. The method of claim 3, wherein the weighting is decided by the number of pixels with intensity values higher than the threshold in each row or column.

5. The method of claim 4, wherein the weighting is higher when the number of continuous pixels which have higher intensity values than the threshold is higher.

6. A pointing system, comprising:
    at least one object;
    an image sensing unit, for sensing the object to generate an image data; and
    a processing unit, for receiving the image data and performing the following steps:
    determining an intensity value for each of a plurality of pixels;
    determining whether said each of a plurality of pixels is a higher intensity pixel which has the intensity value higher than a threshold or a lower intensity pixel which has the intensity value lower than the threshold;
    determining that a portion of pixels in the plurality of pixels belong to an object image corresponding to an object; and
    determining coordinate data of the object based on a number of pixels in each row or column of the portion of the plurality of pixels belonging to the object image and the coordinates of pixels in the portion of the plurality of pixels belonging to the object image;
    wherein when there is at least one lower intensity pixel between two or more higher intensity pixels in a row or column and when the number of the at least one pixel is smaller than or equal to a predetermined number, said at least one lower intensity pixel between two or more higher intensity pixels is defined as part of the object image, and said at least one lower intensity pixel between two or more higher intensity pixels is defined as a pixel with intensity value higher than the threshold; or
    when there is at least one lower intensity pixel with intensity value lower than a threshold between two or more higher intensity pixels in a row or column and when there is no lower intensity pixel between two or more higher intensity pixels in an adjacent row or column, said at least one lower intensity pixel between two or more higher intensity pixels is defined as part of the object image, and said at least one lower intensity pixel between two or more higher intensity pixels is defined as a pixel with intensity value higher than the threshold.

7. The method of claim 6, wherein the at least one object is a light emitting device or a reflective strip.

8. The method of claim 6, wherein the step of determining coordinate data of the object comprises:
    determining a number of continuous pixels with intensity values higher than the threshold in each row or column of the object image; and
    giving a weighting related to the number of continuous pixels to the corresponding row or column and calculating the coordinate data of the object accordingly.

9. The method of claim 6, wherein the weighting is decided by the number of pixels with intensity values higher than the threshold in each row or column.

10. The method of claim 6, wherein the weighting is higher when the number of continuous pixels which have higher intensity values than the threshold is higher.

* * * * *

UNITED STATES PATENT AND TRADEMARK OFFICE
CERTIFICATE OF CORRECTION

PATENT NO. : 9,477,326 B2
APPLICATION NO. : 13/863222
DATED : October 25, 2016
INVENTOR(S) : Yi-Hsien Ko, Chia-Cheun Liang and Nien-Tse Chen It is certified that error appears in the above-identified patent and that said Letters Patent is hereby corrected as shown below:

On the Title Page

Item [73], should read:
PIXART IMAGING INCORPORATION

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*